(12) United States Patent
Stocker

(10) Patent No.: US 8,170,921 B2
(45) Date of Patent: May 1, 2012

(54) DYNAMIC HOSTED SHOPPING CART

(75) Inventor: Elliot Stocker, Dublin (IE)

(73) Assignee: eBay, Inc., San Jose, CA (US)

( * ) Notice: Subject to any disclaimer, the term of this patent is extended or adjusted under 35 U.S.C. 154(b) by 2 days.

(21) Appl. No.: 12/648,562

(22) Filed: Dec. 29, 2009

(65) Prior Publication Data

US 2011/0161201 A1  Jun. 30, 2011

(51) Int. Cl.
*G01C 21/00* (2006.01)
(52) U.S. Cl. ...................................... 705/26.1
(58) Field of Classification Search .............. 705/26, 705/27, 26.1
See application file for complete search history.

(56) References Cited

U.S. PATENT DOCUMENTS

| | | | |
|---|---|---|---|
| 2001/0021917 A1* | 9/2001 | Hatano | 705/26 |
| 2002/0049637 A1* | 4/2002 | Harman et al. | 705/26 |
| 2005/0108104 A1 | 5/2005 | Woo | |
| 2008/0183593 A1* | 7/2008 | Dierks | 705/26 |

OTHER PUBLICATIONS

F5 Networks and Array Networks Settle Patent Dispute; Array Networks Agrees to License F5's Cookie Persistence Patent; Business Wire. New York: Feb. 17, 2004. p. 1; http://proquest.umi.com/pqdweb?did=546888911&sid=12&Fmt=3&clientId=19649&RQT=309&VName=PQD.*
http://bob.pythonmac.org/archives/2005/12/05/remote-json-jsonp, Dec. 5, 2005.
http://docs.jquery.com/Ajax/jQuery.getJSON, Oct. 20, 2011.

* cited by examiner

*Primary Examiner* — Mila Airapetian
(74) *Attorney, Agent, or Firm* — Haynes and Boone, LLP

(57) ABSTRACT

Systems and methods are provided for a Dynamic Hosted Shopping Cart. According to one embodiment, a method comprises configuring a Dynamic Hosted Shopping Cart (DHSC) at a remote server based on communications with a buyer device and at least one seller's server that hosts one or more seller websites. The method also comprises embedding in or floating a widget above the one or more seller websites in connection with the DHSC. The method further comprises dynamically updating contents of the DHSC implemented by the widget according to communicated transaction information. In addition, the method comprises offering checkout across all enabled pages of the one or more seller websites.

37 Claims, 7 Drawing Sheets

414

Payment Provider

Enter your Credit/Debit Card information:

| | |
|---|---|
| Payment Type: | – Select Card – ⌄ |
| Card Number: | |
| Expiry Date: | mm  yy |
| CVV(CSC): | ▢ What's this? |

Enter your Billing information:

| | |
|---|---|
| First Name: | |
| Last Name: | |
| Country: | UNITED STATES ⌄ |
| Address Line 1: | |
| Address Line 2: (optional) | |
| Town/City: | |
| State: | – Choose a State – ⌄ |
| Postcode/ZIP: | |
| Telephone: | |
| Email: | |

( ◁ Back )                    ( Shipping ▷ )
[reset cart]                   ( ⊗ Hide )
                                           416

Payment Provider

Enter your Shipping information:

| Ship To Name: | |
| --- | --- |
| Country: | – Choose a Country – ˅ |
| Address Line 1: | |
| Address Line 2: (optional) | |
| Town/City: | |
| Country/State/Region: | |
| Postcode/ZIP: | |
| Telephone: | |

[copy address from Billing information]

( ◁ Back )      ( Pay Now )

[reset cart]      ( ⊗ Hide )  418

FIG. 4D

| | | | | |
|---|---|---|---|---|
| | Payment Provider | | | |
| A Mug<br>No options | | 1 [remove] | £12.95 | 502 |
| T-Shirt<br>Size: L<br>Colour: White | | 1 [remove] | £9.95 | |
| Dog Clothing<br>Dog Size: Toy<br>Name of Dog: rover | | 1 [remove] | £5.50 | |
| | Sub Total:<br>Shipping Total:<br>Tax Total:<br>Order Total: | | £28.40<br>£9.99<br>£3.16<br>£41.55 | |

504 —( Express Checkout )

The safer, easier way to pay
— OR —

Enter your Credit/Debit Card information:

| | |
|---|---|
| Payment Type: | — Select Card — ▽ |
| Card Number: | |
| Expiry Date: | mm  yy |
| CVV(CSC): | ☐ What's this? |

Enter your Billing information:

| | |
|---|---|
| First Name: | |
| Last Name: | |
| Country: | UNITED STATES ▽ |
| Address Line 1: | |
| Address Line 2: (optional) | |
| Town/City: | |
| State: | — Choose a State — ▽ |
| Postcode/ZIP: | |
| Telephone: | |
| Email: | |

Enter your Shipping information:

| | |
|---|---|
| Ship To Name: | |
| Country: | — Choose a Country — ▽ |
| Address Line 1: | |
| Address Line 2: (optional) | |
| Town/City: | |
| Country/State/Region: | |
| Postcode/ZIP: | |
| Telephone: | |

[copy address from Billing information]

( Pay Now )

FIG. 5

DYNAMIC HOSTED SHOPPING CART

BACKGROUND

1. Technical Field

Embodiments of the present disclosure generally relate to electronic commerce, and more particularly, to a Dynamic Hosted Shopping Cart for on-line transactions.

2. Related Art

In on-line financial transactions, buyers search for and purchase products and services through electronic communications with on-line sellers over electronic networks, such as the Internet. During the course of these transactions, buyers may provide payment in various ways including, for example, credit cards, electronic fund transfers, and other payment techniques offered by on-line payment providers.

Typically, when shopping on-line at a particular seller's website, buyers select items to purchase by clicking on a link for a specific item, and the selected items are placed on reserve in some type of virtual shopping cart while the buyer may continue to browse the particular seller's website. The virtual shopping cart typically allows buyers to add or delete products, specify attributes, such as color, quantity, size, and the like, and purchase products contained within the cart. When a buyer changes or updates data in the virtual shopping cart, for example updates the color or quantity of an item, the updated data is sent to a server and a response is reported through a reload of the seller's webpage. If more updated data is sent as part of an order, the webpage reloads or refreshes again. At a minimum, this obtrusive behavior can be tedious and inconvenient because the buyer might need to toggle back and forth between multiple on-line pages or screens. This may lead to the potential buyer cancelling or abandoning of the transaction, resulting in loss of sales for the seller.

SUMMARY

As will be further described herein in relation to various embodiments, systems and methods are provided for a Dynamic Hosted Shopping Cart (DHSC) for on-line transactions wherein a widget, for example a JavaScript transformable widget, may be embedded or floated above a seller's website to communicate with a remote server, keep track of transaction information such as orders for particular items and offer checkout across all enabled pages of a seller's domain or other enabled domains (cross-domain). Data is handled in an unobtrusive, dynamic way without the need for reloading or refreshing of the seller's web pages.

In accordance with an embodiment of the disclosure, a method comprises configuring a Dynamic Hosted Shopping Cart (DHSC) at a remote server based on communications with a buyer device and at least one server that hosts one or more seller's websites. The method also comprises embedding in or floating a widget above the one or more seller's websites in connection with the DHSC. The method further comprises dynamically updating contents of the DHSC implemented by the widget according to communicated transaction information. In addition, the method comprises offering checkout across all enabled pages of the one or more seller's websites.

In accordance with another embodiment of the disclosure, a Dynamic Hosted Shopping Cart system comprises a remote server adapted to interact with a buyer device and one or more other servers over a network, wherein the remote server is adapted to implement a Dynamic Hosted Shopping Cart (DHSC). The system also comprises one or more processors; and one or more memories adapted to store a plurality of machine-readable instructions. When executed by the one or more processors, the plurality of machine-readable instructions are adapted to cause the Dynamic Hosted Shopping Cart system to: configure the DHSC at the remote server based on communications with the client device and at least one seller server that hosts one or more seller websites; float a widget on the one or more seller websites in connection with the DHSC; dynamically update contents of the DHSC implemented by the widget according to communicated transaction information; and offer checkout across all enabled pages of the one or more seller websites.

In accordance with another embodiment of the disclosure, a network computing device comprises a communication link adapted to communicate with a client device and at least one seller server hosting one or more seller websites over a network. The device also comprises one or more processors and one or more memories adapted to store a plurality of machine-readable instructions. When executed by the one or more processors, the plurality of machine-readable instructions are adapted to cause the network computing device to: configure a Dynamic Hosted Shopping Cart (DHSC) based on communications with the client device and the at least one seller server; float a widget above the one or more seller websites in connection with the DHSC; dynamically update contents of the DHSC implemented by the widget according to communicated transaction information; and offer checkout across all enabled pages of the one or more seller websites.

These and other features and advantages of the embodiments of the present disclosure will be more readily apparent from the detailed description of the embodiments set forth below taken in conjunction with the accompanying drawings.

BRIEF DESCRIPTION OF THE FIGURES

FIGS. 4A-4D are examples of screen shots of different states of a Dynamic Hosted Shopping Cart (DHSC) as seen by a buyer during an on-line transaction process;

FIG. 5 is an example of a screen shot of a Hosted Payment Page (HPP) as seen by a buyer during an on-line transaction process.

Figure 1:
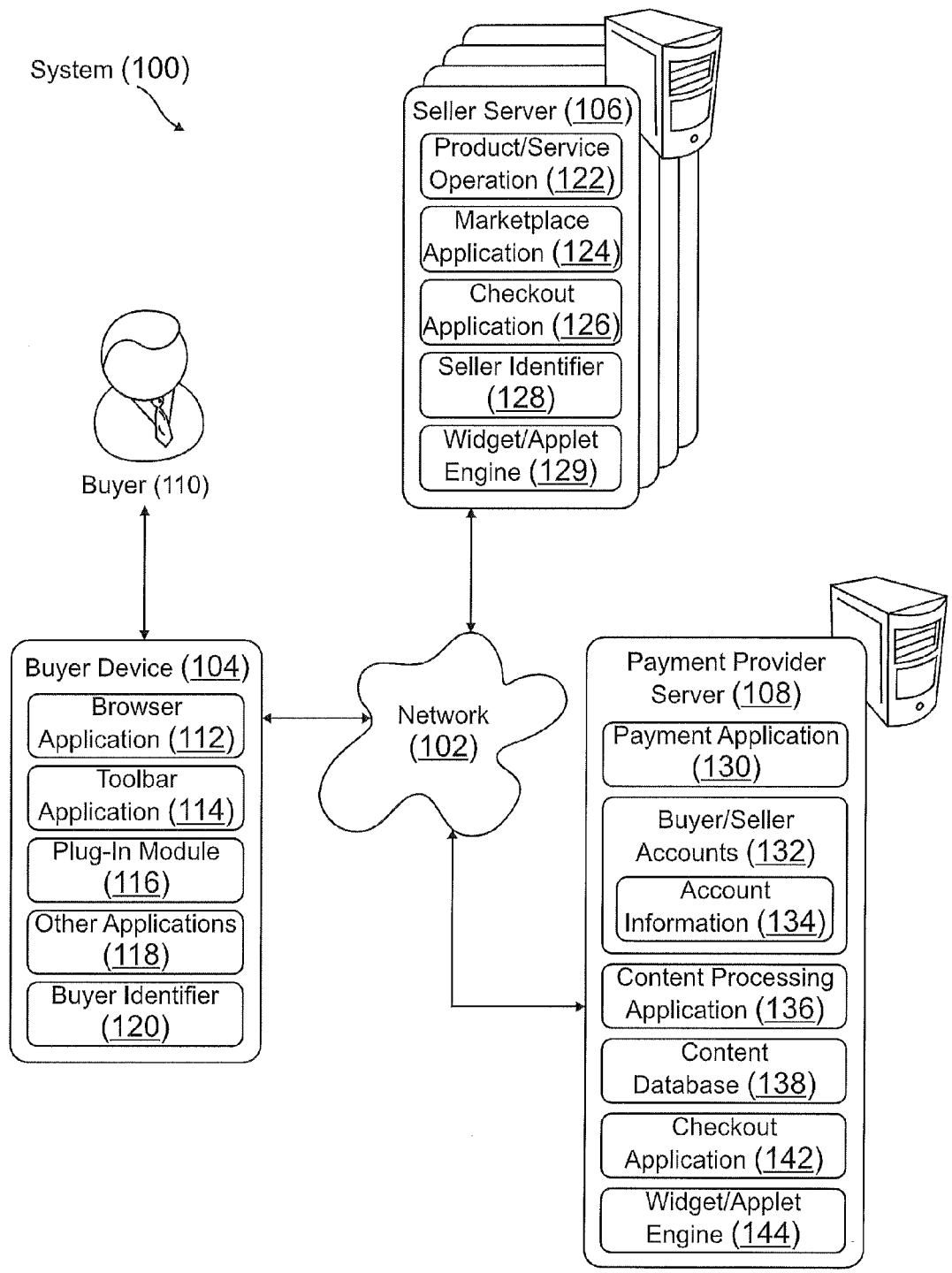
FIG. 1 is a block diagram of a system for facilitating online transactions according to an embodiment of the present disclosure.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

In accordance with various embodiments described herein, methods and systems provide a Dynamic Hosted Shopping Cart (DHSC) at a remote server for on-line transactions. A widget associated with the DHSC, for example a JAVASCRIPT language transformable widget, may be floated above or embedded in a seller's website. The widget may appear in the form of, for example, a button, a link, or the like, on top of each page of the seller's website. The widget monitors a buyer's order sending related data to the remote server. The remote server is configured to communicate with the widget, keeping track of transaction information or data including buyer orders, and offer checkout across all enabled pages of the seller's website, seller's domain or other enabled domains (cross-domain). Thus, transaction information or data is handled in an unobtrusive, dynamic way without the need for reloading or refreshing of web pages.

The Dynamic Hosted Shopping Cart according to one or more embodiments of the present disclosure may be provided with a Hosted Payment Page (HPP) in one package facilitating online-transactions where dynamic technology cannot be presented to the buyer. In one or more embodiments, the remote server used to provide the DHSC and HPP may be implemented, for example, by a seller server operated by the seller or by a third party server. In one embodiment, the remote server may be implemented by a payment service provider such as PAYPAL, Inc. or EBAY, Inc. of San Jose, Calif.

FIG. 1 shows one embodiment of a block diagram of a system 100 configured to perform transactions discussed below over a network 102. As shown in FIG. 1, system 100 includes at least one buyer device 104, one or more on-line seller entities' servers, including business, charity, merchant or retailer servers, (hereinafter referred to as "seller server 106"), and at least one payment provider server 108 in communication over network 102. Network 102, in one embodiment, may be implemented as a single network or a combination of multiple networks. For example, in various embodiments, network 102 may include the Internet and/or one or more intranets, landline networks, wireless networks, or a wireless telecommunications network (e.g., cellular phone network) adapted to communicate with other communication networks, such as the Internet.

Buyer device 104 may be implemented using any appropriate combination of hardware and/or software configured for wired and/or wireless communication over network 102. For example, buyer device 104 may be implemented as a personal computer, mobile device such as a cell phone, or a laptop of buyer 110 in communication with network 102. Buyer device 104 may include one or more browser applications 112 which may be used, for example, to provide a buyer interface to permit buyer 110 to browse information available over network 102. For example, browser application 112 may be implemented as a web browser to view information available over the Internet.

Buyer device 104 may include one or more toolbar applications 114, which may be used, for example, to provide client-side processing for performing tasks in response to operations selected by buyer 110. For example, toolbar application 114 may display a graphical user interface (GUI) in connection with browser application 112. Buyer device 104 may also include a plug-in module 116 for facilitating financial transactions over network 102. In one implementation, plug-in module 116 comprises a software program, such as a graphical user interface (GUI), executable by a processor that is configured to interface and communicate with the one or more seller servers 106 and the payment provider server 108 via network 102. Buyer 110 is able to access on-line seller sites via seller servers 106 to view and select items for purchase, and buyer 110 is able to purchase selected items from the one or more sellers by communicating with the payment provider server 108 via a network browser, such as a web browser.

Buyer device 104 may include other applications 118 as may be desired in particular embodiments to provide additional features available to buyer 110. For example, such other applications 118 may include security applications for implementing buyer-side security features, programmatic buyer applications for interfacing with appropriate application programming interfaces (APIs) over network 102 or various other types of generally known programs and/or applications.

Buyer device 104 may include one or more buyer identifiers 120, which may be implemented, for example, as operating system registry entries, cookies associated with browser application 112, identifiers associated with hardware of buyer device 104, or various other appropriate identifiers. Buyer identifier 120 may include attributes related to the buyer, such as personal information (e.g., a user name, password, photograph image, biometric id, address, phone number, etc.) and banking information (e.g., banking institution, credit card issuer, buyer account numbers, security information, etc.). In various implementations, buyer identifier 120 may be passed with a buyer purchase request to payment provider server 108, and buyer identifier 120 may be used by payment provider server 108 to associate buyer 110 with a particular buyer account maintained by payment provider server 108.

The one or more seller servers 106 may be maintained, for example, by one or more sellers offering various items, such as products and/or services, in exchange for financial payment to be received from buyers, such as buyer 110, over network 102. In this regard, each of the one or more seller servers 106 may include a product/service operation 122 (such as a database, forms, buttons or links), for identifying available products and/or services, which may be made available to buyer device 104 for viewing and purchase by buyer 110. Accordingly, each of seller servers 106 may include a marketplace application 124, which may be configured to provide information over network 102 to browser application 112 of buyer device 104. For example, buyer 110 may interact with marketplace application 124 through browser application 112 over network 102 to search and view various items, products and/or services identified in operation 122.

Seller server 106 may include a checkout application 126 that may implement a Dynamic Hosted Shopping Cart and may be configured to facilitate online purchase transactions by buyer 110 of products and/or services identified by marketplace application 124. In this regard, checkout application 126 may be configured to accept payment information from buyer 110 and/or from payment provider server 108 over network 102. Seller server 106 may provide a widget/applet engine 129 for serving widgets to buyer device 104. Seller server 106 may also include one or more seller identifiers 128, which may be included as part of the one or more items made available for purchase so that particular items are associated with particular sellers. Seller identifier 128 may include attributes related to the seller, such as business and banking information. In various implementations, seller identifier 128 may be passed with a buyer purchase request to payment provider server 108 when buyer 110 selects an item for purchase, and seller identifier 128 may be used by payment provider server 108 to associate a particular item purchased with a particular seller account maintained by payment provider server 108.

Seller entities having a related seller server 106 may need to establish an account with payment provider server 108 so that payment provider server 108 is able to process transactions having items offered for purchase by the seller entities. When establishing an account, the seller entity may need to provide information, such as name, address, phone number, etc., and financial information, such as banking information, account information, credit card information, payment processing information, etc. Seller server 106 may be associated with a particular link (e.g., a link such as a URL (Uniform Resource Locator) to an IP (Internet Protocol) address). In this regard, payment provider server 108 may optionally redirect browser application 112 to an appropriate web page and/or seller site of seller server 106 to facilitate purchase of a corresponding item and/or service available from seller server 106.

Payment provider server 108 may be maintained, for example, by an online payment service provider, which may provide payment processing for online transactions on behalf of buyer 110 to an operator of seller server 106. Payment provider server 108 includes a checkout application 142 that may implement a Dynamic Hosted Shopping Cart and may be configured to facilitate online purchase transactions by buyer 110. Payment provider server 108 may also include a widget/applet engine 144 for serving widgets to buyer device 104. Payment provider server 108 may further include one or more payment applications 130, which may be configured to interact with buyer device 104 and/or each of seller servers 106 over network 102 to facilitate the purchase of items, products and/or services by buyer 110 from seller server 106. In one example, payment provider server 108 is provided by PayPal, Inc.

Payment provider server 108 may be configured to maintain a plurality of buyer and seller accounts 132, each of which may include account information 134 associated with individual users, including buyer 110, and the one or more on-line entities associated with seller servers 106. For example, account information 134 may include private financial information of buyer 110 and the seller entities, such as one or more account numbers, passwords, credit card information, banking information, or other types of financial information, which may be used to facilitate online transactions between buyer 110 of buyer device 104 and one or more seller entities associated with seller servers 106. As such, payment application 130 may be configured to interact with the one or more seller servers 106 on behalf of buyer 110 during a transaction with checkout application 142 without requiring buyer 110 to provide account information 134 directly to seller server 106. Payment provider server 108 may also include a content processing application 136, which may select content from a content database 138 to be provided to buyer 110. Content processing application 136 may provide appropriate rules-based or heuristics-based facilities for selecting appropriate content for buyer 110 based on, for example, buyer identifier 120, buyer account 132, account information 134, information received from seller server 106, or other characteristics.

Payment provider server 108, through checkout application 142 along with payment application 130, buyer/seller accounts 132, content processing application 136, and content database 138, may implement a Dynamic Hosted Shopping Cart, as will be described below. Payment provider server 108, based on communications with seller server 106 and buyer device 104, configures a Dynamic Hosted Shopping Cart that is available to buyer 110 on buyer device 104 throughout all enabled pages of a seller entity's website. The Dynamic Hosted Shopping Cart may appear, for example, as an element, a button or a link on each page of the seller entity's website. Furthermore, the Dynamic Hosted Shopping Cart may appear in different states as will be described in more detail below. Data or transaction information in the Dynamic Hosted Shopping Cart is updated with new transaction information without the need for page re-loading or refreshing. Then, based on information entered by buyer 110 via buyer device 104, buyer 110 may check out from any page of the business entity's website. In an embodiment, upon check out, the Dynamic Hosted Shopping Cart widget in conjunction with either applicable widget/applet engine 144 of payment provider server 108 or widget/applet engine 129 of seller server 106 communicates information, such as order, tax and/or shipping information, to payment provider server 108, and processes information, such as payment information, to effect a transfer of funds to a suitable seller account 132.

Although buyer-seller transactions are illustrated herein, it should be understood that seller-seller, buyer-buyer transactions or other types of transactions may also be implemented according to one or more embodiments described herein.

Figure 2:
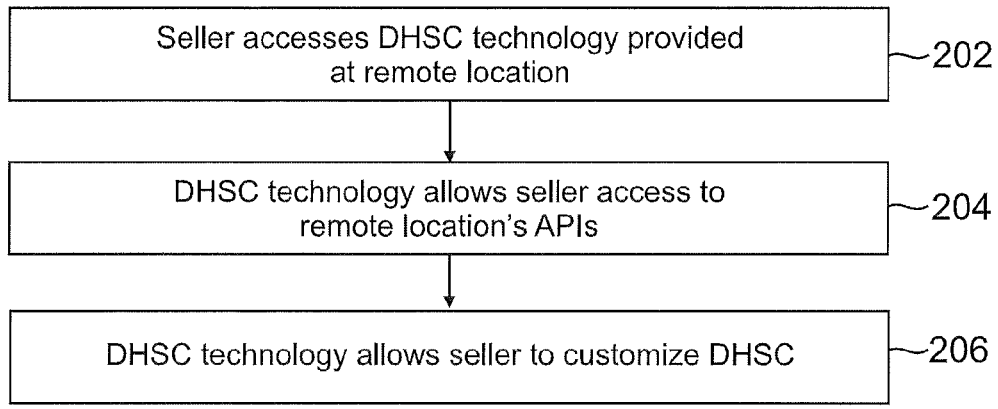
FIG. 2 is a flowchart illustrating a method for setting up a Dynamic Hosted Shopping Cart (DHSC) according to an embodiment of the present disclosure.

FIG. 2 is a flowchart illustrating a method for setting up a Dynamic Hosted Shopping Cart according to an embodiment of the present disclosure. The method of FIG. 2 may be implemented by the system of FIG. 1 according to one or more embodiments. FIG. 2 illustrates an embodiment that enables a seller entity such as a business, charity, merchant or retailer via seller server 106 to set up a Dynamic Hosted Shopping Cart (DHSC) provided by a remote server at a remote location such as an online payment service provider via payment provider server 108.

At block 202, a seller entity (also referred to as "seller"), first accesses an on-line payment service provider site over a network such as the Internet through a device such as a personal computer (PC), a laptop, or a mobile device, using, for example, a standard HTML interface. The seller then navigates through the site to access technology provided therein for a Dynamic Hosted Shopping Cart (DHSC).

At block 204, DHSC technology provided by the on-line payment service provider site allows the seller access to the on-line service provider's APIs without the need for a third party solution or developer.

At block 206, the seller may set up a DHSC to be used in connection with, for example, an online seller's website. The seller may customize the DHSC to look in a way as desired by the seller by using, for example, Cascading Style Sheets (CSS).

Figure 3:
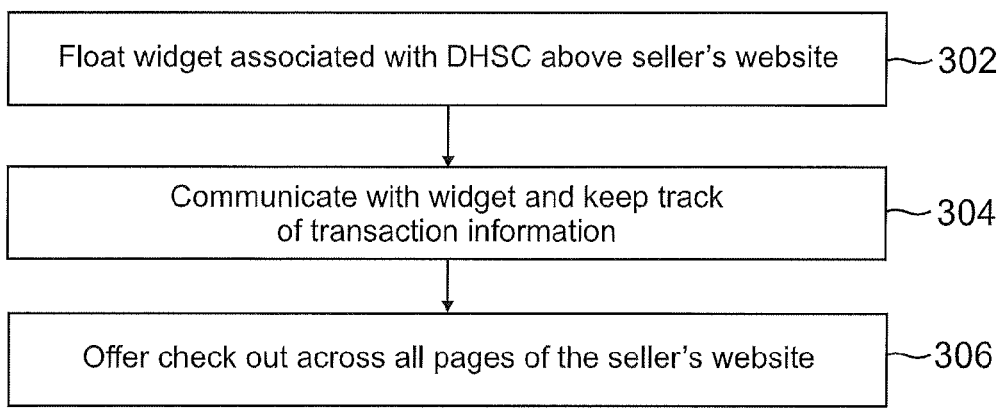
FIG. 3 is a flowchart illustrating a method for facilitating a Dynamic Hosted Shopping Cart (DHSC) according to an embodiment of the present disclosure.

FIG. 3 is a flowchart illustrating a method for facilitating a Dynamic Hosted Shopping Cart according to an embodiment of the present disclosure. The method of FIG. 3 may be implemented by the system of FIG. 1 according to one or more embodiments. FIG. 3 illustrates an embodiment that facilitates a Dynamic Hosted Shopping Cart (DHSC) provided, for example, via payment provider server 108 upon setting up of the DHSC by a seller entity such as a business, charity, merchant or retailer via seller server 106, for example, as described above with respect to FIG. 2.

In one or more embodiments, a customer, user, consumer, or buyer 110 first accesses an on-line shopping site via seller server 106 over network 102 such as the Internet, through a buyer device 104 such as a personal computer (PC), a laptop, or a mobile device. The buyer then navigates through the site to select desired items for purchase. Typically, once an item is shown or identified, the buyer is given an option of placing the item into a virtual shopping cart or basket. The virtual shopping cart or basket may be implemented as a Dynamic Hosted Shopping Cart (DHSC) as set up by an online seller. Desired items are then placed into the shopping cart. After each item is placed in the shopping cart, the buyer has the option of checking out (e.g., pay for the items and designate shipping) or continuing to shop.

At block 302, once an online seller entity (also referred to as "seller") has set up a DHSC provided by a remote location such as payment provider server 106, the seller provides interfaces for items or payment provider interfaces such as buttons, links, or the like, on the seller's website. In this regard, the seller may add software implemented, for example by JavaScript, to the top of each page or screen of the seller's website, which enables a widget associated with the DHSC (referred to as "DHSC widget") to be floated above or embedded in each page of the seller's website.

As known in the art, a widget may be a stand-alone or portable chunk of code that may be installed and executed within any web page by an end user without requiring additional user compilation. A widget may provide relevant information to the user. In one or more embodiments herein, a shopping cart and check out data may be provided in a non-intrusive manner. A single host software system, such as web browser application 112, may run the widget. A widget may be embedded into third party sites, for example a seller's website, by either the website's administration or by any user on a page where the user has rights of authorship. The contents of widgets are often served by servers other than the original site host, enabling dynamic content. For example, the DHSC widget may report the current status of a shopping cart by accessing data from the payment provider server, seller server and/or buyer device. Widgets may be looked upon as stand-alone applications or applets, implemented using web technologies including JAVASCRIPT, ADOBE FLASH, HTML and/or CSS.

The DHSC widget may be generated on demand by a remote server, such as payment provider server 108 or seller server 106 and driven by software such as JavaScript in browser application 112 of buyer device 104. That is, as buyer 110 adds, deletes, orders products or services, or otherwise carries out interactions with seller's web page, the DHSC widget is updated according to the current status of the transaction information without reload of the seller web page.

In an embodiment, the DHSC widget may be a transformable Document Object Model (DOM) element. The DOM is a cross-platform and language-independent convention for representing and interacting with objects in documents such as HTML, XHTML and XML documents. The DOM may be manipulated by JavaScript to inspect or modify a web page dynamically. In other words, DOM is the way JavaScript sees the containing page and browser state.

The DHSC widget may exist at any time in one of various states, for example, in one or four states: cart-mini, cart, checkout-billing and checkout-shipping. These four states of the HSC widget will be described in more detail below with respect to FIGS. 4A, 4B, 4C and 4D according to one or more embodiments.

At block 304, in any one of the various states, the DHSC widget may float on top of, or may be embedded in, the seller's website, following the buyer as the buyer scrolls or jumps from page to page across a domain or seller's website. The DHSC widget facilitates communications with the remote server, e.g., payment provider server 108, which keeps track of transaction information including orders for products or services by a buyer from the seller's website. That is, the content of the DHSC widget is served by a remote server such as payment provider server 108, enabling dynamic content. For example, if buyer 110 desires to update an attribute such as the quantity of an item reserved in the DHSC, the contents of the DHSC are dynamically updated, and the DHSC widget may report the current status of a shopping cart by accessing data from the remote server (e.g., seller server 106 or payment provider server 108) without having to reload the webpage.

Buyer 110 may add, delete or update items, products or services for an order using the DHSC widget by clicking on standard (unencrypted), or payment provider interfaces such as payment provider-hosted HTML form buttons, links, or the like. In an embodiment where payment provider interfaces are used, the DHSC widget may intercept a form element submit event to the payment provider server, making secure requests such as AJAX over HTTPS requests to the remote server (e.g., seller server 106 or payment provider server 108) storing the item, product or service as part of an order via cookies and server-side sessions. When using AJAX technologies, the DHSC widget may be updated by asynchronous/synchronous HTTP requests/responses and/or JSON-P requests/responses with, for example, a SSL secured server, and does not require page loads to add items, products or services to the DHSC, update the DHSC, or process payments (except in an embodiment where a payment provider operation such as an Express Checkout payment is selected, a redirect to the payment provider server may occur as will be described in more detail below).

AJAX (asynchronous JavaScript and XML) is a group of interrelated web development techniques used on a client-side to create interactive web applications. With Ajax, web applications can retrieve data from a server asynchronously in the background without interfering with a display and behavior of an existing page. Thus, the use of Ajax techniques allows interactive or dynamic interfaces on web pages. Data may usually be retrieved using the XMLHttpRequest object and/or JSON-P cross-domain techniques. Despite the name, the use of JavaScript and XML is not actually required, nor do the requests need to be asynchronous.

At block 306, a check out option is offered to buyer 110 when buyer 110 has finished shopping and is ready to check out. Conveniently, the check out option is available across all pages of the seller's website in connection with the DHSC.

It should be noted that true cross-domain shopping is possible according to one or more embodiments of the present disclosure. In that regard, the DHSC widget may be initialized by the seller's page or by buyer 110 from, for example a bookmark, in the buyer's browser application 112 (as opposed to a seller's code). For example, if buyer 110 goes to a first seller's website that has payment provider interfaces such as payment provider-hosted HTML form buttons, links, or the like, buyer 110 may initiate the DHSC widget and add a product or service found in the first seller's website to the DHSC. Then, buyer 110 may continue to browse and go to a second seller's website where buyer 110 may add a second product or service to the DHSC from the second seller's website. Once buyer 110 is ready to check out, the buyer may check out products or services found in the first and second seller's websites through the DHSC widget at the same time. Payment provider server 106 may distribute payments to the first and second sellers, respectively, for example, by using an adaptive payment API or other payment aggregation-distribution operation.

In one embodiment, the DHSC widget may be maintained even if it is removed from a website or domain in which it was originated or initialized. For example, if a seller associated with seller server 106 or buyer 110 decides to remove the DHSC widget, which may appear as a button, a link or the like, from a seller's website that incorporates the DHSC widget, the DHSC widget may be maintained at the remote server and may be accessed or used in conjunction with other websites or domains.

FIGS. 4A-4D are examples of screen shots of different states of a Dynamic Hosted Shopping Cart (DHSC) as seen by a buyer during an on-line transaction process. The examples of FIGS. 4A-4D may respectively correspond to the DHSC widget in one of four states: cart-mini, cart, checkout-billing and checkout-shipping.

Figure 4A:
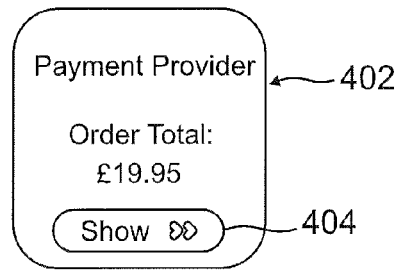

FIG. 4A is an example of a screen shot of a cart-mini state of the HSC widget as seen by a buyer during an on-line transaction process. The DHSC widget 402 in the cart mini state as illustrated in the example of FIG. 4A displays an "Order Total" and is compact. Therefore, it provides a non-intrusive way for tracking the order. DHSC widget 402 may be displayed on buyer device 104 at any location on a web page or screen. At any time, buyer 110 may select to expand the cart mini state of DHSC widget 402 to view a current order in full by selecting, for example, by clicking via a buyer device input interface such as a link, an interface 404, which may be labeled as "Show" or with any other appropriate label.

In an embodiment, the buyer or the seller may have the option of removing the DHSC widget so that it does not appear on a seller's website or domain as the buyer views the seller's website or domain via buyer device 104. For example, a buyer device input interface (not shown), which may be labeled as "Remove" or with any other appropriate label, may be provided on each DHSC widget state to allow the buyer to remove the DHSC widget. Although the buyer may have the option to remove the DHSC widget, the DHSC contents associated with the widget may still be maintained at the remote server and may be accessed or used in conjunction with other websites or domains.

Figure 4B:
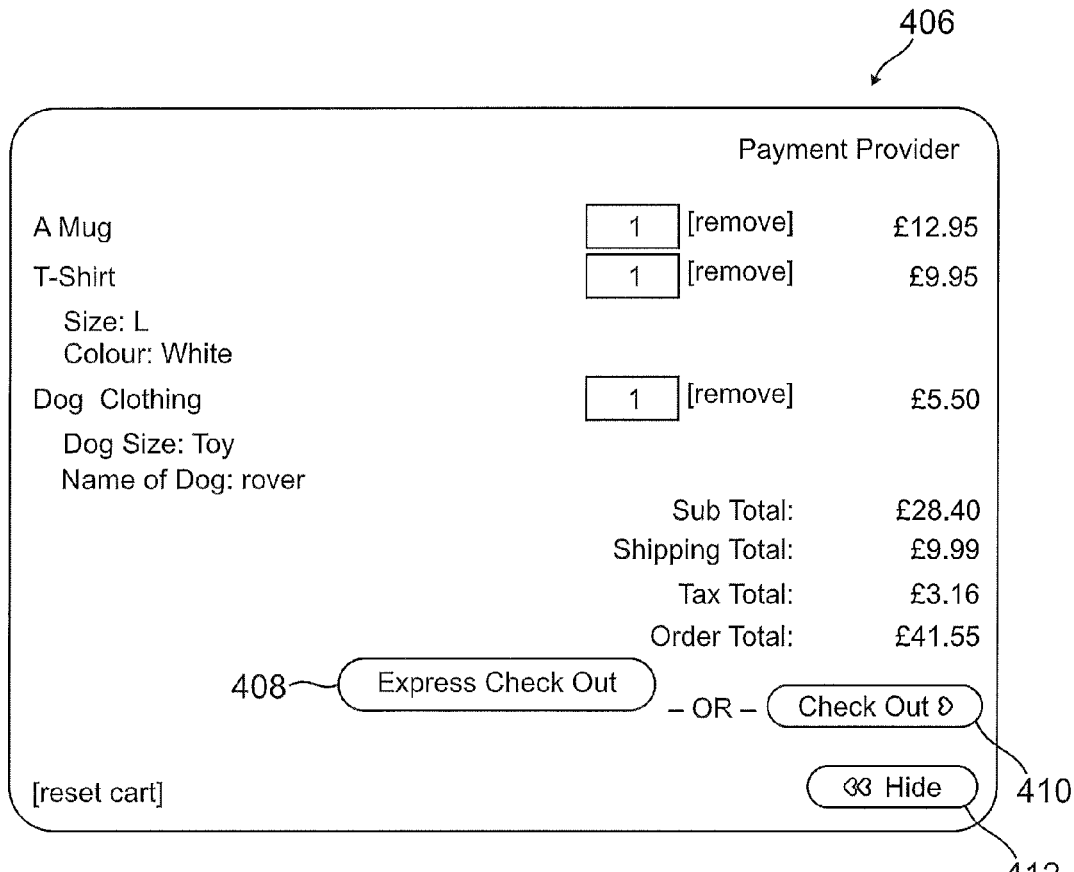

FIG. 4B is an example of a screen shot of a cart state of the DHSC widget. Upon expanding DHSC widget 402 of FIG. 4A to view an order in full, the DHSC widget changes to a cart state, dynamically replacing the cart-mini state with DHSC widget 406. DHSC widget 406 displays more detailed transaction information including a listing of the items, products or services in the DHSC, item options, item costs, order totals and the like. In the cart state as illustrated in DHSC widget 406, the buyer may choose to change or update transaction information, for example, the buyer may edit an order, delete items, or proceed to checkout. It should be noted that the buyer has the option of going back to a previous state of the DHSC widget by selecting or clicking on an interface, which may be labeled as "Hide." For example, when the state of the DHSC widget is expanded to the cart state as illustrated in DHSC widget 406, the buyer has the option of going back to a cart-mini state as illustrated in DHSC widget 402 of FIG. 4A by selecting or clicking on an interface 412, which may be labeled as "Hide".

In one or more embodiments, the buyer may be presented with different checkout options. For example, the buyer may check out using a payment operation through a payment provider such as PayPal, Inc. by selecting or clicking on for example, an Express Checkout interface 408. Alternatively, the buyer may check out and execute payment via a transaction card such as a credit or a debit card by selecting or clicking on an interface 410. Other examples of suitable links may be "Pay With PayPal," "Continue," "Submit," "Checkout," or the like.

In an embodiment where the buyer selects "Express Checkout" through interface 408, the DHSC widget makes a call to the payment provider server to set up the transaction through the Express Checkout API and redirects the buyer to a payment provider site to log-in and execute payment. The buyer is then redirected back to the seller's website where the DHSC widget will initiate the finalization of the transaction using the payment provider.

Alternatively, in an embodiment where the buyer selects to pay with a transaction card such as a credit card or a debit card through interface 410, the DHSC widget changes states again to a checkout-billing state.

FIG. 4C is an example of a screen shot of a checkout-billing state of the DHSC widget as seen by a buyer during an on-line transaction process. Screen shot 414 illustrating the checkout-billing state of the DHSC widget presents billing information fields for a successful transaction. The checkout-billing page includes various fields for the buyer to fill in for payment of the items. For example, fields may include account information about the payment source, name of the buyer, billing address, and contact information. Account information may include selecting a type of payment source, such as a specific type of credit card, a bank card, or a debit card, and entering an account number and a security code or routing number.

Optionally, the buyer may select or click on a "Shipping" interface 416 for shipping information to be provided. It should be noted that in the sale of digital or downloadable goods, no shipping information is required.

FIG. 4D is an example of a screen shot 420 of a checkout-shipping state of the DHSC widget as seen by a buyer during an on-line transaction process. Screen shot 420 illustrating the checkout-shipping state of the DHSC widget presents various fields for the buyer to fill in shipping information such as the name, address and contact information where items are to be shipped. Upon completion of the various fields, the buyer may complete the transaction, for example, by selecting or clicking on an interface 418, which may be labeled as "Pay Now".

Regardless of the way the buyer chooses to check out, for example, via Express Checkout, as may be provided by for example PayPal, Inc., or with a transaction card, the entity hosting the DHSC may send a verification email to both the buyer and the seller detailing the transaction, in addition to any standard emails that may be sent by the payment provider.

In the case where a particular software, for example JAVA SCRIPT, for the DHSC widget is disabled on a buyer's browser such as browser application 112, the buyer may be able to checkout by other standard checkout procedures. In the case of a seller's website that includes payment provider interfaces such as payment provider hosted or non-hosted HTML forms, buttons, links, or the like, the buyer may check out by standard checkout procedures provided as normal by a particular online payment provider website such as PAYPAL, Inc. In this case, the DHSC widget does not intercept the form element submit event to the payment provider server. In an embodiment, if a seller's website does not use payment provider interfaces and instead provides an interface such as HTML forms, buttons, links, or the like, to the remote server (e.g., seller server 106 or payment provider server 108) which stores the buyer order data or transaction information, then the Hosted Payment Page (HPP) functionality will be enabled, as opposed to DHSC functionality.

FIG. 5 is an example of a screen shot of a Hosted Payment Page (HPP) as seen by a buyer during an on-line transaction process.

A HPP such as HPP 502 shown in the exemplary screen shot of FIG. 5 is a one-page checkout screen that may be used for third party cart uploads or the like. A payment provider server may provide the HPP. To use a HPP, a seller may send transaction information such as an order using payment provider website payment standard variables via a request to a handler script on the remote server (e.g., seller server 106 or payment provider server 108). The handler script in turn will respond by generating a web page containing a version of the DHSC widget such as HPP 502 and will present shopping cart data, checkout billing and optionally, checkout-shipping states to the buyer.

HPP 502 gives the buyer the option to checkout with an interface 504 that may be labeled "Express Checkout" and may be provided for example by PAYPAL, Inc., or by using a transaction card. If the buyer chooses to use a transaction card to check out, the buyer is requested to fill in the billing information and optionally the shipping information fields presented therein. Billing information fields may request information such as funding source information, name, address and other contact information. Shipping information fields may request name, address and other contact information, which may the same or different than the billing information.

If the buyer chooses to checkout by selecting or clicking on interface 504 that may be labeled as "Express Checkout" to check out, the buyer may access a checkout page of a payment provider, such as PayPal, Inc. Check out interfaces or links may appear after an item is placed in the shopping cart or may be continually visible during the shopping process. Examples of other suitable links may be "Pay With PayPal," "Continue," "Submit," "Checkout," or the like.

Upon selecting interface 504 that may be labeled as "Express Checkout," the buyer will be redirected to the payment provider server. After login and confirmation of payment, the buyer will be redirected to scripts hosted on the remote server (e.g., seller server 106 or payment provider server 108), as opposed to being redirected to the seller's website (as in the case of the DHSC check out process), where the transaction is finalized The buyer is only redirected to the seller's website after the transaction is completed. Upon completion of a successful transaction, notifications such as email notifications may be sent to both the buyer and the seller.

According to one or more embodiments, the HPP hosted by the remote server (e.g., seller server 106 or payment provider server 108), such as HPP 502, may operate in a browser not running a specific software such as JavaScript. However, page loads would replace techniques based on such specific software such as AJAX HTTP or JSON-P requests.

Figure 6:
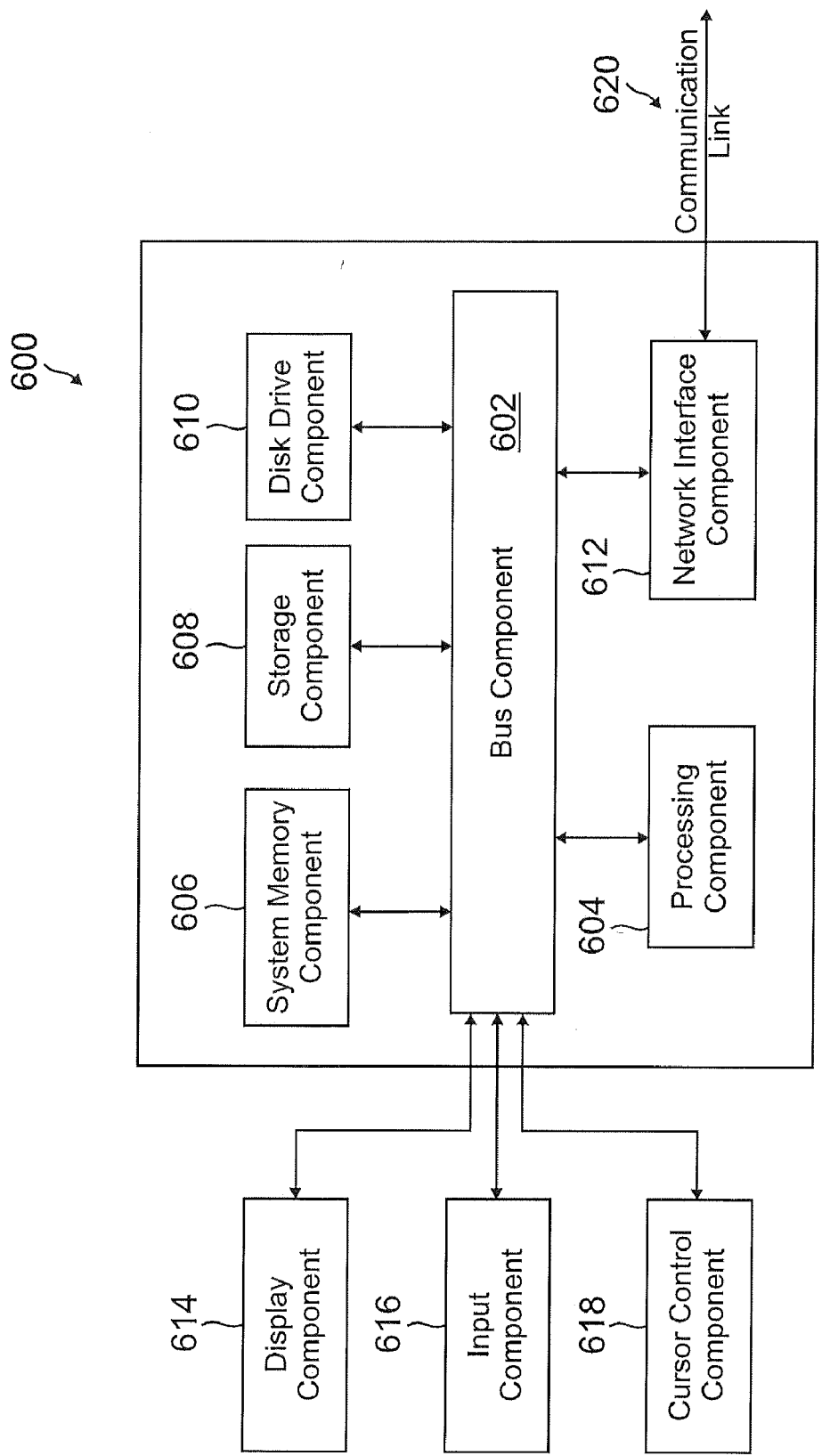
FIG. 6 is a block diagram of one embodiment of a system that may be used to implement one or more components of the system in FIG. 1.

FIG. 6 is a block diagram of a computer system 600 according to one embodiment, which may be suitable for implementing embodiments of various aspects of this disclosure, including, for example, buyer device 104, seller server 106 and/or payment provider server 108. In various implementations of various embodiments, buyer device 104 may comprise a personal computing device, such as a personal computer, laptop, PDA, cellular phone or other personal computing or communications devices. Seller server 106 and/or payment provider server 108 may comprise a network computing device, such as one or more servers, computer or processor combined to provide the payment services. Thus, it should be appreciated that buyer device 104, seller server 106, and/or payment provider server 108 may be implemented as computer system 600 in a manner as follows.

In one embodiment, computer system 600 may include a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 616 (e.g., keyboard or keypad), and/or a cursor control component 618 (e.g., mouse or trackball). In one embodiment, disk drive component 610 may comprise a database having one or more disk drive components.

Computer system 600 may perform specific operations by processor 604 executing one or more sequences of one or more instructions contained in system memory component 606, according to steps described above with respect to FIGS. 2-3. Such instructions may be read into system memory component 606 from another computer readable medium, such as static storage component 608 or disk drive component 610. In other embodiments, hard-wired circuitry may be used in place of or in combination with software instructions to implement one or more embodiments of the disclosure.

Logic may be encoded in a computer readable medium, which may refer to any medium that participates in providing instructions to processor 604 for execution. Such a medium may take many forms, including but not limited to, non-volatile media, volatile media, and transmission media. In various implementations, non-volatile media includes optical or magnetic disks, such as disk drive component 610, volatile media includes dynamic memory, such as system memory component 606, and transmission media includes coaxial cables, copper wire, and fiber optics, including wires that comprise bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments, execution of instruction sequences for practicing embodiments of the disclosure may be performed by computer system 600. In various other embodiments, a plurality of computer systems 600 coupled by communication link 620 (e.g., network 102 of FIG. 1, LAN, WLAN, PTSN, or various other wired or wireless networks) may perform instruction sequences to practice one or more embodiments of the disclosure in coordination with one another.

Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Thus, according to one or more embodiments, by using a DHSC, which may be provided with a HPP by a payment provider server 108 or a seller server 106, the buyer may quickly and easily access the DHSC available through all pages of a seller's website to view items placed therein and/or complete a purchase from an on-line seller entity. The DHSC allows transaction information to be handled in an unobtrusive manner without the need to reload pages. According to one or more embodiments, a DHSC widget may be floated on, or embedded in, each page of the seller's website, for example, in the form of a button on which the buyer may click to view the DHSC. The DHSC may be viewed in various states including a compact view only showing, for example, an order total, or it may be viewed in an expanded state, for example, listing the items and checkout options. The checkout options may include multiple payment and shipping options that enable the buyer to submit payment information easily and in some cases, without entering sensitive financial information.

The foregoing disclosure is not intended be limiting to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in form and detail without departing from the scope of the disclosure. Thus, the disclosure is limited only by the claims.

What is claimed is:

1. A method comprising:
configuring a Dynamic Hosted Shopping Cart (DHSC) at a remote server based on communications with a buyer device and at least one server that hosts one or more seller's websites;
floating a widget on the one or more seller's websites in connection with the DHSC;
dynamically updating contents of the DHSC implemented by the widget according to communicated transaction information;
offering checkout across all enabled pages of the one or more seller's websites;
removing the widget from the one or more seller's websites if desired; and
maintaining, at the remote server, contents of the DHSC associated with the widget even if the widget is removed from the one or more seller's websites, such that the remote server allows the contents of the DHSC associated with the widget to be accessed or used in conjunction with other websites or domains.

2. The method of claim 1, wherein the floating further comprises following a buyer using the buyer device as the buyer scrolls or jumps from page to page across the enabled pages of the one or more seller's websites.

3. The method of claim 1, wherein the remote server further comprises a seller server, a third party server or a payment provider server.

4. The method of claim 1, wherein the widget further comprises a transformable widget using JavaScript, Adobe Flash, HTML, and/or CSS.

5. The method of claim 1, wherein the widget appears as an element, a button or a link throughout all the enabled pages of the one or more seller's websites.

6. The method of claim 1, wherein the dynamically updating further comprises updating the communicated transaction information in connection with the DHSC without page reloading.

7. The method of claim 6, wherein AJAX type requests by the widget are received at the remote server for updated transaction information.

8. The method of claim 1, further comprising displaying the widget, wherein the widget comprises various states including a cart-mini state, a cart state, a checkout-billing state or a checkout-shipping state.

9. The method of claim 8, wherein the cart-mini state is compact and comprises at least an order total.

10. The method of claim 8, wherein the cart state further comprises more detailed transaction information including a listing of items, products or services in the DHSC, item options, item costs, and/or order totals.

11. The method of claim 8, wherein the checkout-billing state further comprises at least one billing information field.

12. The method of claim 8, wherein the checkout-shipping state further comprises at least one shipping information field.

13. The method of claim 1, wherein the offering checkout further comprises offering checkout via a payment provider checkout option or a transaction card option.

14. The method of claim 1, further comprising:
allowing a seller to access Dynamic Hosted Shopping Cart technology at the remote server;
allowing the seller to access APIs provided by the remote server using the Dynamic Hosted Shopping Cart technology; and
allowing the seller to customize the DHSC associated with the widget floating above at least one website of the seller.

15. The method of claim 1, further comprising providing true cross-domain shopping, comprising:
allowing initialization of the widget;
dynamically updating the contents of the DHSC according to transaction information involving a buyer and a first seller's website;
dynamically updating the contents of the DHSC according to transaction information involving the buyer and a second seller's website; and
offering checkout in connection with the updated contents of the DHSC according to the transaction information involving the buyer and both the first and second seller's websites through the widget at the same time.

16. The method of claim 15, wherein the allowing the initialization further comprises allowing initialization of the widget through the first seller's website, through the second seller's website, or by a buyer using the buyer device.

17. The method of claim 15, wherein the offering checkout further comprises offering checkout across all enabled pages in a cross-domain.

18. The method of claim 15, wherein the remote server further comprises a payment provider server, and the first and second seller's websites further comprise interfaces including payment provider-hosted HTML form buttons and/or links.

19. The method of claim 18, further comprising distributing payments, by the payment provider server, to a first and a second seller respectively operating the first and second seller's websites by using an adaptive payment API.

20. The method of claim 1, further comprising providing a Hosted Payment Page (HPP) by the remote server, operating in a browser of the client device not running a specific software.

21. The method of claim 20, further comprising providing the HPP and the HSC in one package.

22. A Dynamic Hosted Shopping Cart system comprising:
a remote server adapted to interact with a buyer device and one or more other servers over a network, wherein the remote server is adapted to implement a Dynamic Hosted Shopping Cart (DHSC);
one or more processors; and
one or more memories adapted to store a plurality of machine-readable instructions which when executed by the one or more processors are adapted to cause the Dynamic Hosted Shopping Cart system to:
configure the DHSC at the remote server based on communications with the client device and at least one seller server that hosts one or more seller websites;
float a widget on the one or more seller websites in connection with the DHSC;
dynamically update contents of the DHSC implemented by the widget according to communicated transaction information;
offer checkout across all enabled pages of the one or more seller websites;
remove the widget from the one or more seller websites if desired; and
maintain, at the remote server, contents of the DHSC associated with the widget even if the widget is removed from the one or more seller websites, such that the remote server allows the contents of the DHSC associated with the widget to be accessed or used in conjunction with other websites or domains.

23. The system of claim 22, wherein the remote server further comprises a payment provider server, the at least one seller server or a third-party server.

24. The system of claim 22, wherein the widget further comprises a transformable widget using JavaScript, Adobe Flash, HTML, and/or CSS.

25. The system of claim 22, wherein the network further comprises the Internet and/or one or more intranets, landline networks, wireless networks, or a wireless telecommunications network adapted to communicate with other communication networks.

26. The system of claim 22, wherein the buyer device further comprises a personal computer, a mobile device, or a laptop adapted to communicate with the network.

27. The system of claim 22, wherein the plurality of machine-readable instructions are adapted to cause the Dynamic Hosted Shopping Cart system to float the widget in the form of an element, a button or a link above each page of the one or more seller websites.

28. The system of claim 22, wherein the floating further comprises following a buyer using the buyer device as the buyer scrolls or jumps from page to page across the one or more seller websites.

29. The system of claim 22, wherein the updating further comprises updating the communicated transaction information in connection with the DHSC without page reloading.

30. The system of claim 22, wherein the plurality of machine-readable instructions are adapted to cause the Dynamic Hosted Shopping Cart system to display the widget, wherein the widget comprises various states including a cart-mini state, a cart state, a checkout-billing state or a checkout-shipping state.

31. The system of claim 22, wherein the plurality of machine-readable instructions are adapted to cause the Dynamic Hosted Shopping Cart system to:
allow a seller to access Dynamic Hosted Shopping Cart technology at the remote server;
allow the seller to access APIs provided by the remote server using the Dynamic Hosted Shopping Cart technology; and
allow the seller to customize the DHSC associated with the widget floating above at least one website of the seller.

32. The system of claim 22, wherein the plurality of machine-readable instructions are adapted to cause the Dynamic Hosted Shopping Cart system to further provide true cross-domain shopping, comprising:
allowing initialization of the widget;
dynamically updating the contents of the DHSC according to transaction information involving the buyer and a first seller's website;
dynamically updating the contents of the DHSC according to transaction information involving the buyer and a second seller's website; and
offering checkout in connection with the updated contents of the DHSC according to the transaction information involving the buyer and both the first and second seller's websites through the widget at the same time.

33. The system of claim 32, wherein the allowing the initialization further comprises allowing initialization of the widget through the first seller's website, through the second seller's website, or by a buyer using the buyer device.

34. The system of claim 32, wherein the plurality of machine-readable instructions are adapted to cause the Dynamic Hosted Shopping Cart system to distribute payments, by the remote server, to a first and a second seller respectively operating the first and second seller's websites by using an adaptive payment API.

35. The system of claim 22, wherein the plurality of machine-readable instructions are adapted to cause the Dynamic Hosted Shopping Cart system to provide a Hosted Payment Page (HPP) by the remote server, operating in a browser of the client device not running a specific software.

36. A network computing device comprising:
a communication link adapted to communicate with a client device and at least one seller server hosting one or more seller websites over a network;
one or more processors; and
one or more memories adapted to store a plurality of machine-readable instructions which when executed by the one or more processors are adapted to cause the network computing device to:
configure a Dynamic Hosted Shopping Cart (DHSC) based on communications with the client device and the at least one seller server;
float a widget above the one or more seller websites in connection with the DHSC;
dynamically update contents of the DHSC implemented by the widget according to communicated transaction information;
offer checkout across all enabled pages of the one or more seller websites remove the widget from the one or more seller websites if desired; and
maintain, at the remote server, contents of the DHSC associated with the widget even if the widget is removed from the one or more seller websites, such that the remote server allows the contents of the DHSC associated with the widget to be accessed or used in conjunction with other websites or domains.

37. The device of claim 36, further comprising a payment provider server, a seller server and/or a third-party server.

* * * * *